Sept. 6, 1966 P. R. MARZAN ETAL 3,271,699
BALANCED MODULATOR HAVING THE ANODE OF A MULTIPLIER PHOTOTUBE
DIRECTLY CONNECTED TO THE CATHODE OF THE MODULATOR TUBE
Filed July 19, 1963
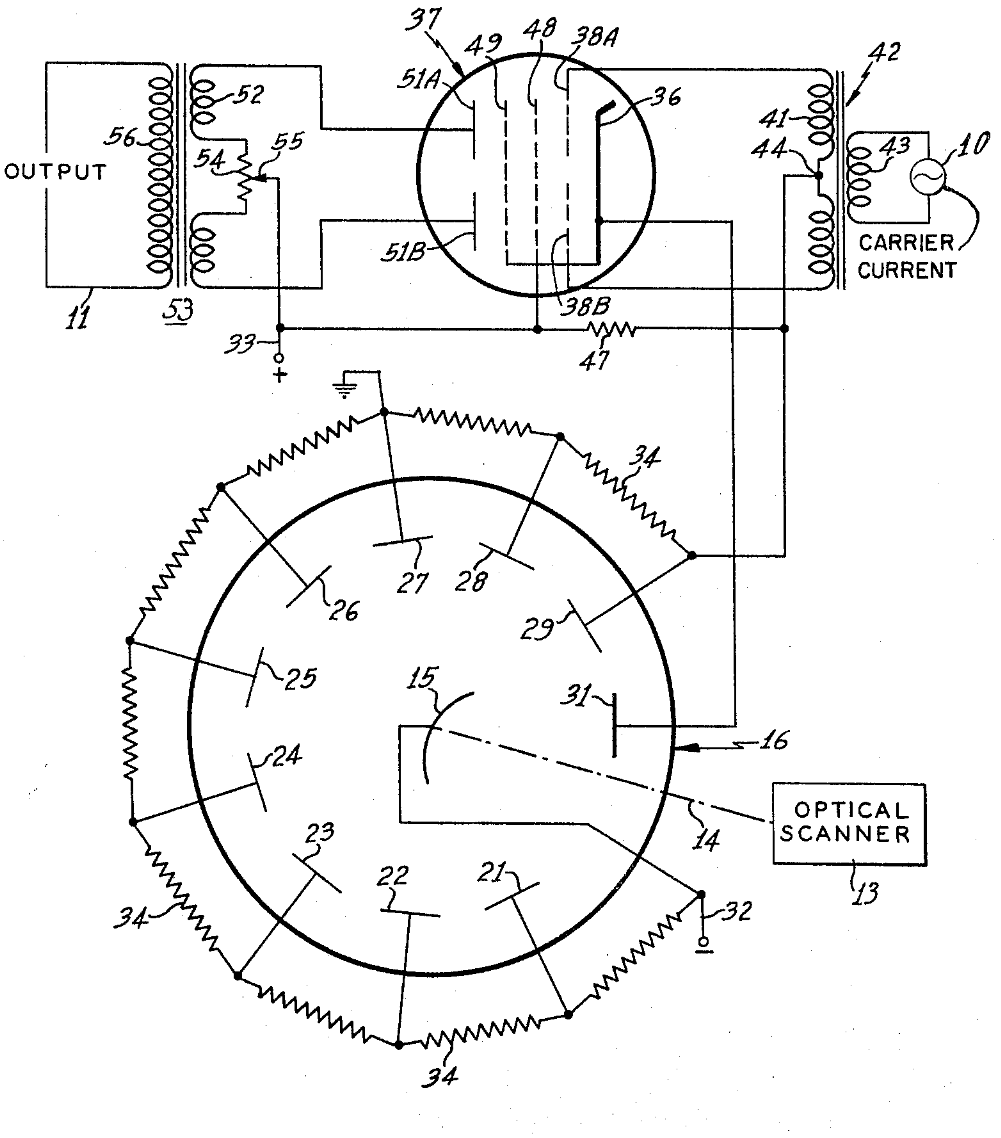
INVENTORS
P. R. Marzan & J. R. Thonnard
BY E. R. Evans
ATTORNEY United States Patent Office 3,271,699
Patented Sept. 6, 1966

3,271,699
BALANCED MODULATOR HAVING THE ANODE OF A MULTIPLIER PHOTOTUBE DIRECTLY CONNECTED TO THE CATHODE OF THE MODULATOR TUBE

Peter R. Marzan, New City, N.Y., and John R. Shonnard, Montclair, N.J., assignors to Litton Systems, Inc., Beverly Hills, Calif.
Filed July 19, 1963, Ser. No. 296,306
4 Claims. (Cl. 332—3)

This invention relates to an electrical circuit for modulating a carrier signal, for example in accordance with the signal output of a phototube. The phototube is preferably of the multiplier type and adapted to be used in facsimile or other optical scanning apparatus.

An object of the invention is to provide an improved balanced modulator-phototube system in which the modulator space discharge device is connected directly to the anode of the phototube and develops a stable output current varying in amplitude in proportion to the anode current of the phototube.

Another object of the invention is to develop, in a photoelectric system employing a multiplier phototube, an amplitude-modulated carrier substantially free from noise, non-linearity or other undesired characteristics, with a simplified balanced modulating circuit. The modulating arrangement may comprise electron space discharge means having two space discharge paths generated by one or more cathodes connected to the anode of the multiplier phototube, said space discharge paths both being connected to the steady input carrier and to the modulated output carrier circuits.

In facsimile and other optical scanning systems employing a phototube, many different circuits have been devised for converting the impedance or output current variations of the phototube to corresponding amplitude variations of a carrier current to provide a modulated A.C. carrier signal. Since the phototube is usually a single-ended device and its impedance varies over a wide range with the variations in the light excitation, these systems are rather complex and are subject to drift, distortion and an undesirably high noise-to-signal ratio. The problems encountered are particularly troublesome in the case of a high-frequency carrier, above 30 kc. for example. A feature of the present invention is that it overcomes these disadvantages of prior modulating systems by connecting the output collector or anode of the phototube directly to the cathode of a twin-type tube having two separate space discharge paths, so that the cathode current and hence the currents in both said paths will be directly controlled by the variations in the dynamic impedance of the phototube, which is a function of the excitation of the photocathode of said phototube. The parallel space discharge paths are so connected to the respective terminals on an output circuit as to provide a balanced output carrier which varies in amplitude in accordance with the variations in the light excitation of the phototube.

Another feature of the invention relates to a phototube modulator system for modulating a carrier current embodying a pair of identical space discharge paths connected respectively to the terminals of a source of carrier current and to the terminals of the modulated carrier output circuit, said space discharge paths being arranged to respond to the variations in impedance of a multiplier phototube, as for example by connecting the pair of space discharge paths across a direct-current source in series relation with said phototube.

In accordance with one embodiment of the invention, a balanced modulator for a multiplier phototube comprises a twin pentode tube having its cathode connected to the collector or anode of the phototube, a pair of control grids connected to the terminals of a source of carrier current to be modulated and a pair of anodes connected to the carrier output circuit. The suppressor grid of the pentode tube is connected to the cathode to minimize the effect of secondary emission from the anodes and the screen grid is arranged to reduce capacitive coupling between the anodes and control grids. The carrier current in the output circuit is amplitude-modulated by the variations in the dynamic impedance of the multiplier phototube over a wide range of variations in said impedance, and a balanced output is obtained without external balancing components which vary with time, changes in ambient temperature, and so forth.

These and other features and advantages of the invention will become apparent from the following description of an illustrative embodiment thereof shown in the accompanying drawing, the single figure of which is a schematic diagram of a phototube circuit arranged to control a balanced modulator comprising a twin pentode tube.

While the invention will, for purposes of illustration, be described in connection with a facsimile transmission system, it will be understood that the inventive concept is equally applicable to other systems utilizing scanning means to translate light variations into corresponding electrical signals. Furthermore since facsimile apparatus is well known, the facsimile scanning apparatus with the exception of the phototube is not shown in detail.

In the drawing, a source 10 of carrier current is shown, said source being modulated to produce a modulated output current in the output circuit 11. The carrier source may be in the audio-frequency range or as high as 1 mc. or more, if desired. By way of example, the signals to be impressed upon the carrier may be derived from an optical scanner 13 of a facsimile or picture transmitter, said scanner being effective to generate a light beam 14 which varies in intensity with the variations in shading of the elemental areas of the picture or subject matter being transmitted, the light beam 14 impinging upon the photocathode 15 of a multiplier phototube 16 of any well known type, such, for example, as the RCA type 931A tube. As shown this phototube has a series of nine dynodes 21–29 and a single anode or collector electrode 31. It will be understood that a phototube having any desired number of multiplier dynodes may be used. Furthermore other suitable types of phototubes may be employed although the high gain and sensitivity of the multiplier phototube make it especially desirable for the modulator system embodying the invention. While the wide range of output current between maximum and minimum levels of light excitation introduces difficulties when such a tube is used in connection with a carrier modulator, the modulator circuit according to the invention minimizes the distortion or noise problems ordinarily encountered.

The direct-current energizing source for the phototube 16 is connected through the conductors 32 and 33 to a series of voltage divider resistors 34 connected to the dynodes 21–29 in the usual manner. A similar energizing circuit for the dynodes of a multiplier phototube is shown for example in the prior patent to W. H. Hill, No. 3,050,696, assigned to the assignee of the present application. Any suitable means for supplying the potentials required for the operation of the phototube may be employed, since the phototube circuit per se forms no part of the present invention.

In accordance with the invention, modulating means comprising two parallel space paths is connected in series relation with the multiplier phototube 16, said space discharge paths including anodes connected to the output circuit and cathode means so connected to the phototube 16 as to vary the space discharge currents in accordance with variations in the dynamic impedance of the phototube. Thus a twin pentode amplifier tube 37 may be employed, said tube having a single cathode 36 connected to the collector electrode or anode 31 of the phototube 16, this connection providing the only cathode return path for said tube 37 whereby the space discharge currents are solely dependent upon the changing resistance or impedance of the phototube 16. The tube 37 may be an RCA type 6939 or a pair of space discharge tubes may be employed having their separate cathodes connected to the anode 31. The twin pentode tube is preferred since it avoids the selection of two tubes having matching characteristics, and a balanced output over the entire signal range is easier to obtain. As shown by way of example, the twin pentode tube 37 is provided with two controls grids 38A and 38B connected to the secondary winding 41 of a transformer 42 having its primary winding 43 connected to the carrier source 10. The midpoint tap 44 on the winding 41 is connected to the final dynode 29 of the multiplier phototube 16, and also connected through a load resistor 47 to screen grid 48 and to the positive terminal of the power supply. The suppressor grid 49 of the tube 37 is connected to the cathode 36 in the conventional manner. The pair of anodes 51A and 51B for the respective space discharge paths of tube 37 are connected to the terminals of a split primary winding 52 of a wideband output transformer 53. The two halves of the primary winding are connected through a resistor element 54 of a potentiometer provided with an adjustable contact 55 connected to the positive terminal of the power supply source. The secondary winding 56 of the output transformer 53 supplies the output circuit 11. The potentiometer is provided to obtain a precise centertap connection where the halves of the split winding 52 are not identical.

The modulation of a high-frequency carrier in a system of this type involves several problems where a stable modulation characteristic, minimum noise and a wide dynamic range are desired. The multiplier type of phototube is particularly desirable for applications requiring high sensitivity to light but the characteristics of this phototube require modulator characteristics which take account of the wide signal range. Under "dark" current conditions, when the cathode of the phototube has zero or small light excitation, the impedance of the phototube approaches infinity and the circuit to the modulator is effectively open. According to the invention the modulating arrangement disclosed has stable operating characteristics and low noise when used with a phototube of this character and operating over a wide range, for example from zero to, say, one milliampere phototube output current. In the illustrative embodiment shown, the difference in potential between the cathode 36 and the anodes 51A and 51B causes current to flow in the two parallel space discharge paths of the twin pentode tube 37, the space currents being modulated by the control grids 38A and 38B connected to the source 10 of steady carrier current which may be of high frequency, as pointed out above. Since the pentode tube 37 is connected in series relation with the multiplier phototube 16 to the D.C. power source, through a D.C.-conductive path of zero or negligible resistance, the space currents and thus the current in the output circuit 11 varies directly with the changes in the impedance of the phototube 16. The parallel space discharge paths including the anodes 51A, 51B and the output transformer 53 provide a balanced modulated output without any requirement for external balancing capacitors, inductances or other components ordinarily used to balance the modulator currents, thus avoiding the difficulties resulting from changes in the characteristics of the balancing components with time, temperature, and so forth.

In actual practice the modulator circuit described above has been found to provide stable modulating characteristics over a wide range of input signals with substantial linearity. If desired, a stable non-linear output characteristic of the balanced modulator shown may be provided by employing a compressor network or device in the collector circuit of the photomultiplier. Such a compressor circuit would modify the dynamic characteristic of the photomultiplier output current.

It is to be understood that the above-described circuit and method are illustrative of the application of the principles of the invention. Other arrangements within the scope of the invention may be devised by those skilled in the art, as pointed out above. Accordingly, it is evident that various changes may be made in the method and apparatus disclosed above, without departing from the spirit of the invention as defined in the appended claims.

What is claimed is:

1. A balanced modulator comprising
a twin pentode tube provided with a cathode, a pair of control grids and a pair of anodes,
a signal input circuit connected to said cathode,
a source of steady carrier current connected to said pair of control grids,
an output circuit connected to said pair of anodes,
a multiplier phototube having an anode for generating a signal in said signal input circuit, and
a direct-current source for energizing said twin pentode tube and said phototube, said twin pentode tube, signal input circuit and phototube being connected in series relation across the terminals of said direct-current source, the anode of the phototube being connected to said input circuit.

2. A multiplier phototube circuit comprising
a multiplier phototube having an anode, a photo-cathode and a plurality of dynodes including a final dynode,
means including a direct-current source and a voltage divider to apply a unidirectional voltage between said cathode and each of said dynodes, and
a balanced modulator including a twin pentode tube provided with a cathode, and
a pair of anodes connected to an output circuit, and
a pair of control grids,
a carrier source connected to said control grids, and
a connection between said twin pentode tube cathode and the anode of said multiplier phototube effectively connecting the pentode tube and said phototube in series relation whereby the current in said output circuit is modulated in accordance with the impedance variations of said multiplier phototube resulting from variations in the light excitation thereof.

3. A multiplier phototube circuit comprising
a multiplier phototube having an anode, a photo-cathode and a plurality of dynodes including a final dynode,
means including a direct-current source and a voltage divider to apply a unidirectional voltage between said cathode and each of said dynodes,
a carrier input circuit,
an output circuit, and
a balanced modulator including a twin space discharge tube connected between said input and output circuits for modulating the current in said output circuit in accordance with the variations in the light excitation of said multiplier phototube,
said twin tube being provided with a cathode connected to the anode of said multiplier phototube, a pair of control grids connected to the terminals of said carrier input circuit and a pair of anodes connected to the terminals of said output circuit, the connection from said cathode to the anode of the phototube providing the only cathode return path for said discharge tube.

4. A multiplier phototube circuit comprising a multiplier phototube having an anode, a photo-cathode and a plurality of dynodes, means including a direct-current source and a voltage divider to apply a unidirectional voltage between said cathode and each of said dynodes, a carrier input circuit having a carrier source and two input terminals, an output circuit, and a balanced modulator including an electron discharge tube means connected between said input terminals and the output circuit for modulating the current in said output circuit in accordance with the variations in the light excitation of said multiplier phototube, said discharge tube means comprising two discharge paths, a cathode, pair of control grids, one for each of said discharge paths, and a pair of anodes in said discharge paths, said grids being connected to the terminals of said input circuit, and said anodes being connected to the terminals of said output circuit, and means effectively connecting the discharge paths of said discharge tube means in series relation with said phototube including a connection from the anode of the multiplier phototube to the cathode of the discharge tube means.

References Cited by the Examiner

UNITED STATES PATENTS

| | | | |
|---|---|---|---|
| 2,202,629 | 5/1940 | Hansell | 332—43 X |
| 2,442,138 | 5/1948 | Mann et al. | 332—43 X |
| 2,462,849 | 3/1949 | Dishal et al. | 332—43 |
| 2,561,219 | 7/1951 | Nyman | 332—43 X |
| 2,572,016 | 10/1951 | Elbourn | 332—63 |
| 3,118,112 | 1/1964 | Gatfield | 332—43 |
| 3,166,722 | 1/1965 | Reid | 332—63 X |

HERMAN KARL SAALBACH, *Primary Examiner.*

P. L. GENSLER, *Assistant Examiner.*